UNITED STATES PATENT OFFICE.

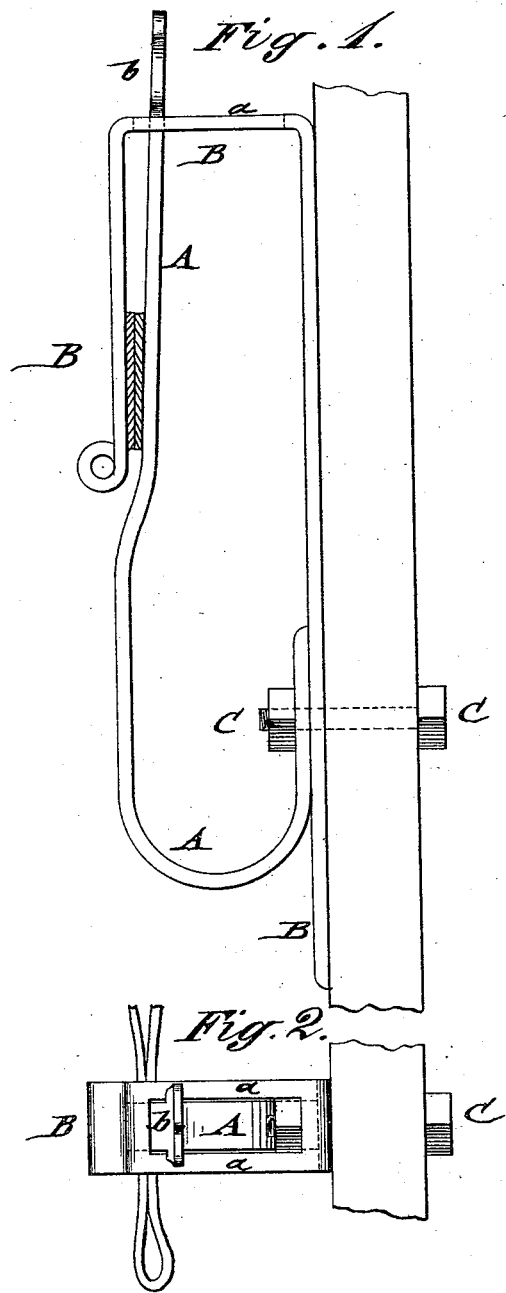

RANSOM P. MURRAY, OF ASHTABULA, OHIO.

IMPROVEMENT IN REIN-HOLDERS.

Specification forming part of Letters Patent No. 186,748, dated January 30, 1877; application filed December 18, 1876.

*To all whom it may concern:*

Be it known that I, RANSOM P. MURRAY, of Ashtabula, in the county of Ashtabula and State of Ohio, have invented a new and Improved Rein Holder, of which the following is a specification:

In the accompanying drawing, Figure 1 represents a side view, and Fig. 2 a top view, of my improved rein-holder.

Similar letters of reference indicate corresponding parts.

The invention has reference to an improved construction of rein-holder, by which the reins may be tightly adjusted or displaced in a moment, preventing their dropping down and getting dirty or entangled with other parts.

The invention consists of two steel springs attached by one fastening-bolt, their free ends passing in opposite directions to each other, one end extending through a top slot of the upper spring part, to be guided thereby when inserting or detaching the reins.

In the drawing, A represents the lower and B the upper part of my improved rein-holder, which sections are both made of spring-steel properly finished. The spring-sections are arranged in opposite directions to each other, and attached jointly at their overlapping ends by a strong bolt and nut, C, to the dash-board or other suitable point on the wagon-body. The upper spring-section B is of inverted U shape, and its free spring end curved outwardly, to admit the ready passing in of the reins between the same and the spring end of the lower section, which is slightly curved inwardly at that point, as shown in Fig. 1, to facilitate the insertion of the lines. The spring end of the lower section A passes upward through a guide-slot, *a*, of the upper spring-section, being above the slot provided with a thumb-piece, *b*, in the shape of a shield or other ornament, so that when the projecting spring end is pressed upon by the thumb, the reins are readily introduced between or dropped out of the springs. The sections are made strong enough to exert sufficient pressure on the reins to hold them firmly between the spring ends when placed between the same.

The rein-holder is, on account of its spring parts, not easily broken when brought in contact with any hard substance, and may be neatly and ornamentally finished, so as to form a permanent and useful fixture to carriage and wagon bodies.

Having thus described my invention, I claim as new and desire to secure by Letters Patent—

The combination of the spring-sections A and B, arranged in opposite direction, and attached by bolt C, the upper spring end of section A passing along the opening end of section B, and through a guide-slot, *a*, above the same, forming a thumb-piece, *b*, substantially as specified.

RANSOM PORTER MURRAY.

Witnesses:
C. W. THOMAS,
SYLVESTER WEBSTER.